(12) United States Patent
Kizaki

(10) Patent No.: US 6,829,744 B1
(45) Date of Patent: Dec. 7, 2004

(54) DOCUMENT PROCESSING APPARATUS, METHOD, AND MEMORY MEDIUM

(75) Inventor: Junichiro Kizaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,194

(22) Filed: Apr. 7, 2000

(30) Foreign Application Priority Data

Apr. 9, 1999 (JP) .......................................... 11-101974

(51) Int. Cl.$^7$ .............................................. G06F 15/00
(52) U.S. Cl. ....................... 715/509; 715/503; 715/520
(58) Field of Search ................................. 715/509, 508, 715/504, 520, 503, 506, 517, 510

(56) References Cited

U.S. PATENT DOCUMENTS

| | | | | |
|---|---|---|---|---|
| 5,594,847 A | * | 1/1997 | Moursund | 345/645 |
| 5,881,381 A | * | 3/1999 | Yamashita et al. | 715/509 |
| 6,055,549 A | * | 4/2000 | Takano | 715/503 |
| 6,112,214 A | * | 8/2000 | Graham et al. | 715/503 |
| 6,199,080 B1 | * | 3/2001 | Nielsen | 715/513 |
| 6,225,996 B1 | * | 5/2001 | Gibb et al. | 345/784 |
| 6,292,809 B1 | * | 9/2001 | Edelman | 715/503 |
| 6,460,059 B1 | * | 10/2002 | Wisniewski | 715/503 |
| 6,579,324 B1 | * | 6/2003 | Lowry et al. | 715/504 |

* cited by examiner

*Primary Examiner*—Joseph Feild
*Assistant Examiner*—Dang Nguyen
(74) *Attorney, Agent, or Firm*—Fitzpatrick, Cella, Harper & Scinto

(57) ABSTRACT

There is disclosed a document processing apparatus which enhances operability with respect to a character line inputted in the vicinity of a table format. When a designated area extends from the inside of the table format to the outside of the table format, the vicinity area of the table format is treated as a cell, and the character lines inputted in the cell in the table format specified by the designated area and the area treated as the cell of the vicinity of the table format are selected as a series of character lines.

46 Claims, 13 Drawing Sheets

---

これからは、ニューヨークを拠点に、アーティスト鹿山哲一郎の新たな旅が始まる。踊りに、振り付けに、
そしてプロデュースにと、全世界を舞台にした華麗な跳躍に期待したい。
以下のような、世界のトップダンサーが、鹿山と一緒に踊る！

| | WILLIAM | MICHAEL | GARY | |
|---|---|---|---|---|
| CLASS(*1) | PRINCIPAL | SOLOIST | SOLOIST | |
| BORN | GREECE | SOUTH AFRICA | IRELAND | |
| JOINED | 1994 | 1997 | 1998 | |
| MAGNUM OPUS | SWAN LAKE | MANON | THREE SISTERS | |
| REMARKS | A DANCER WITH TECHNIQUE AND RELIABLE ABILITY | A DANCER WITH DELICATE AND COOL ATMOSPHERE | A DANCER WITH A HIGH JUMP | (*1)THE CLASS AS OF MARCH, 1999 |

これからは、ニューヨークを拠点に、アーティスト鹿山哲一郎の新たな旅が始まる。踊りに、振り付けに、
そしてプロデュースにと、全世界を舞台にした華麗な跳躍に期待したい。
以下のような、世界のトップダンサーが、鹿山と一緒に踊る！

A DANCER WITH DELICATE AND COOL ATMOSPHERE
( A DANCER WITH HIGH JUMP
 ) (*1) THE CLASS AS OF MARCH, 1999

|  | WILLIAM | MICHAEL | GARY |
|---|---|---|---|
| CLASS(*1) | PRINCIPAL | SOLOIST | SOLOIST |
| BORN | GREECE | SOUTH AFRICA | IRELAND |
| JOINED | 1994 | 1997 | 1998 |
| MAGNUM OPUS | SWAN LAKE | MANON | THREE SISTERS |
| REMARKS | A DANCER WITH TECHNIQUE AND RELIABLE ABILITY | A DANCER WITH DELICATE AND COOL ATMOSPHERE | A DANCER WITH A HIGH JUMP |

(*1) THE CLASS AS OF MARCH, 1999

|  | WILLIAM | MICHAEL | GARY |
|---|---|---|---|
| CLASS(*1) | PRINCIPAL | SOLOIST | SOLOIST |
| BORN | GREECE | SOUTH AFRICA | IRELAND |
| JOINED | 1994 | 1997 | 1998 |
| MAGNUM OPUS | SWAN LAKE | MANON | THREE SISTERS |
| REMARKS | A DANCER WITH TECHNIQUE AND RELIABLE ABILITY | A DANCER WITH DELICATE AND COOL ATMOSPHERE | A DANCER WITH A HIGH JUMP |

401 / 402

(*1) THE CLASS AS OF MARCH, 1999

| | WILLIAM | MICHAEL | GARY |
|---|---|---|---|
| CLASS(*1) | PRINCIPAL | SOLOIST | SOLOIST |
| BORN | GREECE | SOUTH AFRICA | IRELAND |
| JOINED | 1994 | 1997 | 1998 |
| MAGNUM OPUS | SWAN LAKE | MANON | THREE SISTERS |
| REMARKS | A DANCER WITH TECHNIQUE AND RELIABLE ABILITY | A DANCER WITH DELICATE AND COOL ATMOSPHERE | A DANCER WITH A HIGH JUMP |

501   503   502

(*1) THE CLASS AS OF MARCH, 1999

| | WILLIAM | MICHAEL | GARY |
|---|---|---|---|
| CLASS(*1) | PRINCIPAL | SOLOIST | SOLOIST |
| BORN | GREECE | SOUTH AFRICA | IRELAND |
| JOINED | 1994 | 1997 | 1998 |
| MAGNUM OPUS | SWAN LAKE | MANON | THREE SISTERS |
| REMARKS | A DANCER WITH TECHNIQUE AND RELIABLE ABILITY | A DANCER WITH DELICATE AND COOL ATMOSPHERE | A DANCER WITH A HIGH JUMP |

(*1) THE CLASS AS OF MARCH, 1999
    601      602

|  | WILLIAM | MICHAEL | GARY |
|---|---|---|---|
| CLASS(*1) | PRINCIPAL | SOLOIST | SOLOIST |
| BORN | GREECE | SOUTH AFRICA | IRELAND |
| JOINED | 1994 | 1997 | 1998 |
| MAGNUM OPUS | SWAN LAKE | MANON | THREE SISTERS |
| REMARKS | A DANCER WITH TECHNIQUE AND RELIABLE ABILITY | A DANCER WITH DELICATE AND COOL ATMOSPHERE | A DANCER WITH A HIGH JUMP |

701　703

(*1) THE CLASS AS OF MARCH, 1999

|  | WILLIAM | MICHAEL | GARY |
|---|---|---|---|
| CLASS(*1) | PRINCIPAL | SOLOIST | SOLOIST |
| BORN | GREECE | SOUTH AFRICA | IRELAND |
| JOINED | 1994 | 1997 | 1998 |
| MAGNUM OPUS | SWAN LAKE | MANON | THREE SISTERS |
| REMARKS | A DANCER WITH TECHNIQUE AND RELIABLE ABILITY | A DANCER WITH DELICATE AND COOL ATMOSPHERE | A DANCER WITH A HIGH JUMP |

これからは、ニューヨークを拠点に、アーティスト鹿山哲一郎の新たな旅が始まる。踊りに、振り付けに、そしてプロデュースにと、全世界を舞台にした華麗な跳躍に期待したい。
以下のような、世界のトップダンサーが、鹿山と一緒に踊る！

A DANCER WITH DELICATE AND COOL ATMOSPHERE
A DANCER WITH HIGH JUMP
(*1) THE CLASS AS OF MARCH, 1999

| | WILLIAM | MICHAEL | GARY |
|---|---|---|---|
| CLASS | PRINCIPAL | SOLOIST | SOLOIST |
| BORN | GREECE | SOUTH AFRICA | IRELAND |
| JOINED | 1994 | 1997 | 1993 |
| MAGNUM OPUS | SWAN LAKE | MANON | THREE SISTERS |
| REMARKS | A DANCER WITH TECHNIQUE AND RELIABLE ABILITY | A DANCER WITH DELICATE AND COOL ATMOSPHERE | A DANCER WITH A HIGH JUMP |

THE CLASS AS OF MARCH, 1999

これからは、ニューヨークを拠点に、アーティスト鹿山哲一郎の新たな旅が始まる。踊りに、振り付けに、そしてプロデュースにと、全世界を舞台にした華麗な跳躍に期待したい。
以下のような、世界のトップダンサーが、鹿山と一緒に踊る！

Labels: AREA 1204, START POINT 1201, SELECTED RECTANGULAR 1203, END POINT 1201, CELL 1205

DOCUMENT PROCESSING APPARATUS, METHOD, AND MEMORY MEDIUM

BACKGROUND OF THE INVENTION

1. Field of the Invention

The present invention relates to a document processing apparatus, method, and memory medium in which a table format can be made and edited in a document edition area.

2. Related Background Art

In a related art, when a table format is made in a text area, a table format area is separate from other text parts. When the table format area is disposed in a position with left and right margins on a sheet surface, characters can also be inserted to left and right areas separately from the table format area in some cases.

As described above, in the related art, when the table format is mixed in a normal text on a document sheet, the normal text is of course disposed above and below the table format, and may be disposed on the left and right, but there is a case in which the left and right character lines and the table format data are to be processed without being separated from each other.

Moreover, for the character line in each cell constituting the table format, when the character line is designated only in the cell, the character line itself is selected, but when the character line over the cells is selected, all the character lines included in a wrong cell are selected. This operation is performed in many applications. This is based on the idea that the character lines separated by the cells are divided from one another in the context, but it is natural to designate the whole rather than to designate the character line from midway to midway.

SUMMARY OF THE INVENTION

The present invention has been developed in consideration of the above-described related art, and an object thereof is to enable character input on both sides of a table format, so that the area can be treated in a similar manner as cells in the table format, and operability is enhanced.

To solve the above-described related-art problem, according to the present invention, there are provided a document processing apparatus, method, and memory medium in which in a document edition area comprising an adjacent area as a cell adjacent to a table format including a plurality of cells, and a table format area enabling input of character lines, when an area is designated, and the designated area extends from the cell in the table format to the cell of the adjacent area, the character line included in the designated cell in the table format and the character line included in the designated cell of the adjacent area are selected as a series of character lines.

To solve the above-described related-art problem, according to the present invention, it is further preferable to make the table format area enabling the input of the character line in the document edition area in which the adjacent area adjacent to the table format including a plurality of cells includes a cell.

To solve the above-described related-art problem, according to the present invention, it is preferable that when the designated area includes the cell in the table format and the cell of the adjacent area, the character line selected by the character line selecting step comprises a unit of cell.

To solve the above-described related-art problem, according to the present invention, when the area is designated, it is preferable to input a start point and an end point of the area to be designated, and designate a cell included on a line connecting the inputted start point to the end point as the selected area.

To solve the above-described related-art problem, according to the present invention, when the area is designated, it is preferable to input a start point and an end point of the area to be designated, and designate a cell including a rectangular area formed by the inputted start point and end point as the selected area.

To solve the above-described related-art problem, according to the present invention, when the area is designated, it is preferable to input a start point and an end point of the area to be designated, and designate a start cell and an end cell specified by the inputted start point and end point, and a cell between the cells as the selected area.

To solve the above-described related-art problem, according to the present invention, when the character line is selected, it is preferable to insert a line spacing between the character lines divided by a table format ruled line among the character lines which are selection objects.

To solve the above-described related-art problem, according to the present invention, it is preferable to paste the selected character line to a position to which a pasting instruction is given in accordance with the pasting instruction.

To solve the above-described related-art problem, according to the present invention, the cell is preferably an area divided by a ruled line constituting the table format.

To solve the above-described related-art problem, according to the present invention, when row by row writing is performed in the document edition area, the adjacent area is preferably at least one of left and right areas of the table format.

To solve the above-described related-art problem, according to the present invention, when column by column writing is performed in the document edition area, the adjacent area is preferably at least one of upper and lower areas of the table format.

To solve the above-described related-art problem, according to the present invention, there are provided a document processing apparatus, method, and memory medium in which by making a table format area including a table format in a document edition area, designating enable/disable of character input to the area adjacent to the table format in the made table format area, and treating the adjacent area as the cell in which the character input is designated as enabled, area designation is performed.

To solve the above-described related-art problem, according to the present invention, it is preferable to set the cell in the adjacent area of the made table format when the table format is made.

To solve the above-described related-art problem, according to the present invention, when the character input is instructed with the number of characters exceeding the number of characters able to be arranged in the area in which the character input is designated as enabled, it is preferable to enlarge the cell so that the characters designated to be inputted can be arranged. It is further preferable to enlarge the table format with the enlargement of the cell.

To solve the above-described related-art problem, according to the present invention, when row by row writing is performed in the document edition area, the adjacent area is preferably at least one of left and right areas of the table format.

To solve the above-described related-art problem, according to the present invention, when column by column writing is performed in the document edition area, the adjacent area is preferably at least one of upper and lower areas of the table format.

To solve the above-described related-art problem, according to the present invention, it is preferable to switch the adjacent area in accordance with a document direction.

To solve the above-described related-art problem, according to the present invention, it is preferable to determine the adjacent area to be treated as the cell in accordance with a table format position and a document style.

Other features and advantages of the patent invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing the example of a screen in which the table format is made.

FIG. 4 is a diagram showing the example of the screen in which an area is designated in one cell of the table format.

FIG. 5 is a diagram showing the example of the screen in which the area is designated over different cells in the table format.

FIG. 6 is a diagram showing the example of the screen in which the area is designated in the vicinity of the table format.

FIG. 7 is a diagram showing the example of the screen in which the area extending to the outside from the inside of the table format is designated.

FIG. 9 is a diagram showing the example of the screen in which the selected character line is pasted.

FIG. 12 is a diagram showing the example of the screen in which a rectangular area extending to the inside from the outside of the table format is designated.

DETAILED DESCRIPTION OF THE PREFERRED EMBODIMENTS

Preferred embodiments of the present invention will be described hereinafter with reference to the accompanying drawings.

Figure 1:
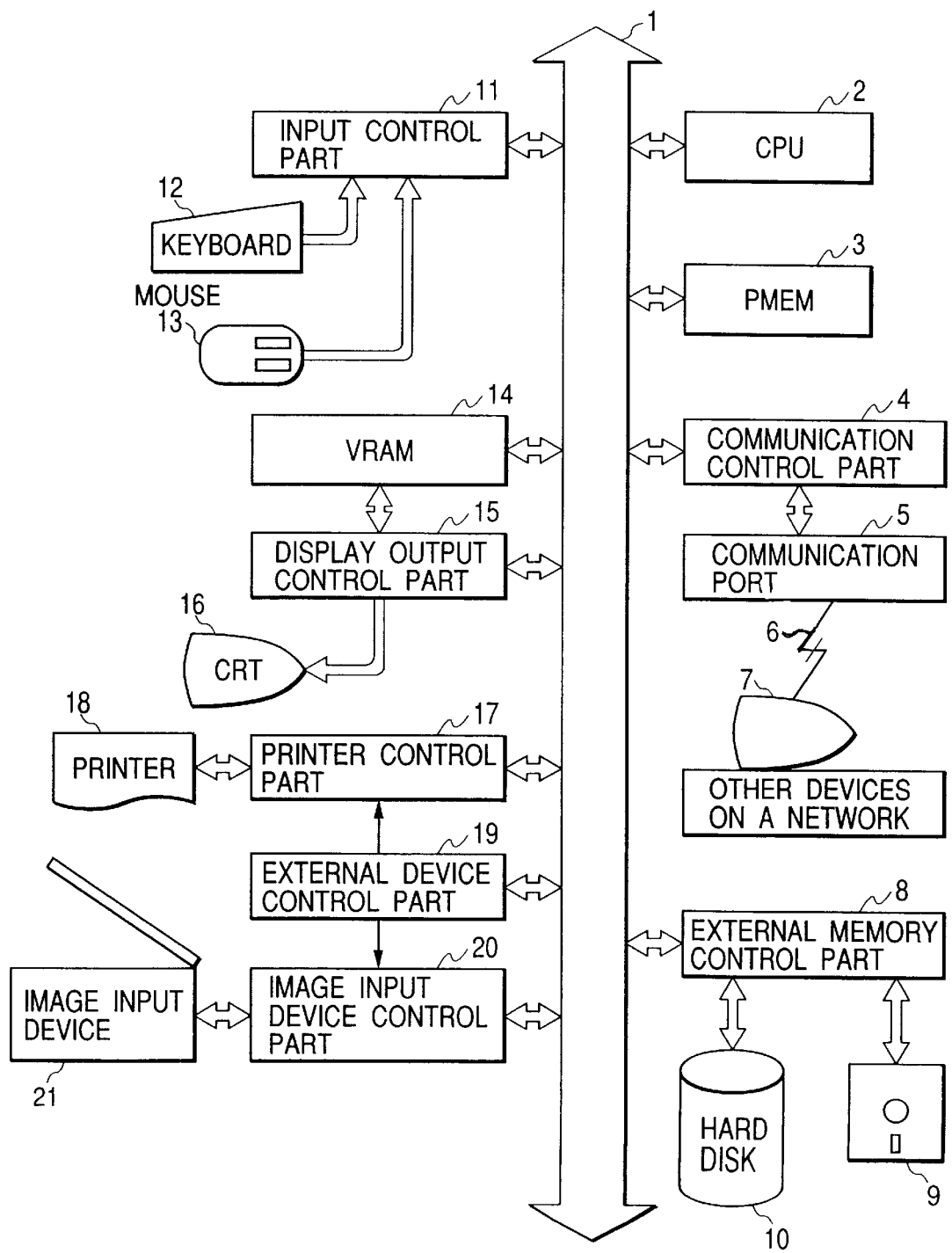
FIG. 1 is a system block diagram of an apparatus of the present invention.

FIG. 1 is a system block diagram of an apparatus according to a preferred embodiment of the present invention.

A system bus 1 enables the transmission/reception of data between constitutions described later. A central processing unit (CPU) 2 executes various processings of the present invention in accordance with a control program stored in a PMEM 3 described later. The processing shown in a flowchart described later is also executed by the CPU 2. The PMEM 3 is a memory for appropriately selecting, reading and storing the control program of various processings of the present invention from a hard disk 10. The control program of the processing shown in the flowchart described later is also stored in the PMEM 3. Moreover, the PMEM 3 also functions as a text memory, and stores the text data inputted from a keyboard 12 and the text data read from an external memory medium 9 and hard disk 10 by the control of an external memory control part 8. A communication control part 4 controls input/output data in a communication port 5. The communication port 5 is connected to communication ports 7 of other devices on a network via communication lines 6 such as LAN and WAN based on the control by the communication control part 4, and performs transmission and reception of the data. The sending of print data to a printer connected to the network, and the inputting of data from a scanner similarly connected to the network are also performed via the communication port 5.

The external memory control part 8 controls the reading and writing of the data with respect to data file memories such as the hard disk (HD) 10 and the external memory medium 9 (e.g., floppy disk, MO, CD-R) detachably attached to the present apparatus. An input control part 11 controls the input of data from the keyboard 12, mouse 13, and other input devices. Here, the mouse 13 may be replaced with a tablet, a touch panel, and the like as long as it functions as coordinate input means for inputting the coordinate of a position designated on the display screen of a CRT 16. Furthermore, any other means can be used as long as the selection/designation can be performed by depressing a button, or tapping in the designated coordinate position. By operating the mouse, the designated position indicated by a mouse cursor is set as a desired position. For example, by positioning the cursor on a command icon on a command menu, and depressing the button, the command indicated by the command icon can also be inputted. Moreover, the edition object and mapping position can also be designated by the mouse 13. An operator operates the keyboard 12 to input character codes and various operation commands.

A video image memory (VRAM) 14 is a memory for holding images displayed on displays such as CRT, and the displayed data is developed and written to bit map data by the control of a display output control part 15, and displayed on the CRT 16. The display is not limited to the CRT, and a liquid crystal display may be used. A printer control part 17 performs the output control of data to a connected printer 18. The printer 18 functions as means for printing the image, and includes LBP, ink jet printer, and the like. An image input device control part 20 controls a connected image input device 21. The image input device 21 may be a scanner for optically reading a laid original, or a film scanner. Alternatively, the image input device may execute a function of reading image data from the memory. In FIG. 1, the printer control part 17 and printer 18, or the image input device 21 and image input device control part 20 are described as separate constitutions, but these may, of course, be physically separate components or one component.

Figure 2:
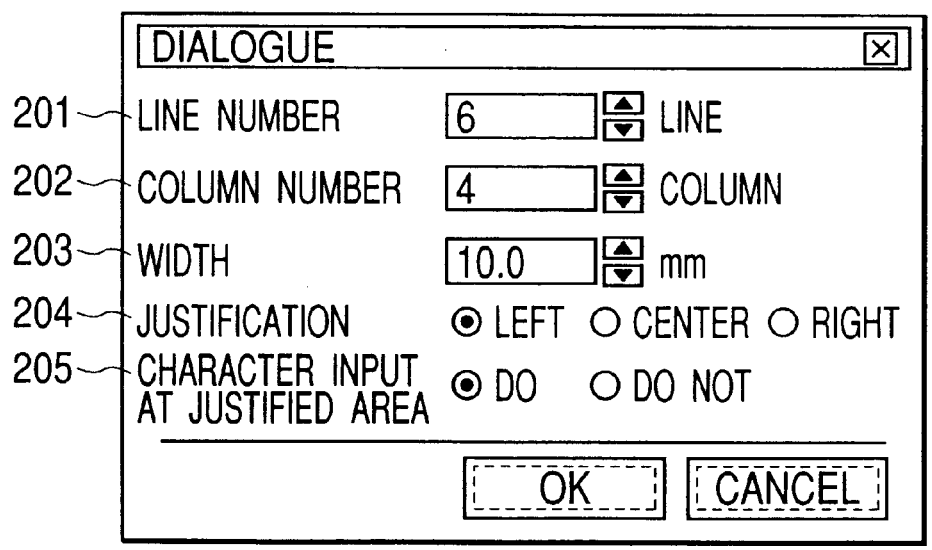
FIG. 2 is a diagram showing an example of dialog during the making of a table format.

FIG. 2 shows an instruction screen for making a table format, and the screen is displayed on the CRT 16 in response to an instruction for the start of table format making from the input control part 11.

The table format is made by designating values to specify a cell line number 201 and column number 202. In this case, a cell width 203 can also be inputted.

A justification 204 designates a left/right disposing position of the table format, and is selected from three justifications: left; right; and center justifications with respect to a surface area. In the actual operation, by designating absolute values of sizes of left and right areas with respect to the surface area, the left and right areas are set, so that the table format may be disposed between the areas. For example, when the left justification is designated in accordance with the justification information, the left end of the table format is disposed on the very limit of a left margin.

Numeral 205 denotes a designation of whether characters can be inputted in the left/right area of the table format. When a space for inputting characters is made in the left/right, it is designated whether the character input to the space is accepted. When the character input is possible, and the left justification is designated in 204, it is judged that the character input is possible only in the right area. When the right justification is designated, the character input is possible only in the left area. When the center justification is designated, the character input is possible in the left and right areas. However, when the width of the table format obtained from the width information and the multiplication of the column number is not narrower than the width of the document edition area, the space for inputting the characters cannot be made in the left or right, so that the character input becomes impossible. For this designation, in the actual operation, it may individually be designated whether the character input is possible in the left or the right. Moreover, a gap between the table format and the left/right character line may be designated.

FIG. 3 shows a screen in which characters are inputted to the table format, and the characters are inputted to each cell by the input control part 11 in the table format in which six lines, four columns and left justification are designated as shown in FIG. 2 to enable the left/right character input. Since the left justification is designated in the table format, the characters can be inputted to the right area of the table format.

Numeral 301 denotes the table format. The inside is constituted of cells 302, and in the table with the left justification, a character input area 303 is generated in the right. Each of the areas divided by ruled lines 304 is called the cell. Moreover, numeral 305 denotes an edition surface, and 306 denotes a sheet. The edition surface 305 shows a document edition area which is calculated from a sheet size, margin, and the like set in a document style.

FIG. 4 shows an example in which an area is designated in the cell.

Within the cell, in a similar manner as a normal text area, a part is designated, cut and subjected to edition such as font attribution in many cases. Therefore, as shown in FIG. 4, by dragging/moving a mouse pointer from a start point 401 to an end point 402, the character line between the start point and the end point is selected because the start point 401 and end point 402 are in the same cell. The character line of the designated area is counterturn-displayed so that the line can be distinguished from other character lines, and in response to the subsequent instruction, an instructed processing is executed for the character line of the designated area. For example, when a cutting instruction is inputted, the text memory and VRAM 14 are controlled to store the character line in the HD 10, and delete the character line from the CRT 16, and the subsequent characters are fed forward to update the display. Additionally, even when the mouse pointer is dragged/moved to the point 401 from the point 402, the character line similar to that of FIG. 4 is selected in the area.

FIG. 5 shows an example in which the area beyond the cell is designated.

In the table format, the related character lines are arranged in the cells, but the contents of different cells are separated from one another in the context. For the area designation beyond the cell, all the character lines in the cells included in the mouse movement are usually selected. Therefore, as shown in FIG. 5, when the mouse pointer is dragged/moved beyond ruled lines 503 into another cell area (point 502) from a certain cell area (point 501), the character lines in all the cells to the cell 502 from the cell 501 are selected. Additionally, also when the mouse pointer is dragged/moved to the cell 501 from the cell 502, the character lines in all the cells to the cell 502 from the cell 501 are selected in a similar manner as FIG. 5.

FIG. 6 shows an example in which the area designation is performed in the left/right area of the table format.

Since the left/right area itself of the table format is separated from another cell by the ruled line, it is a closed area in the context in many cases. Therefore, as shown in FIG. 4, within the area, similarly to the normal text area, the characterline of a part can be selected. Therefore, when the mouse pointer is moved to 602 from 601 as shown in FIG. 6, the character line to the movement end from the movement start in the area is selected. The character line of the designated area is counterturn-displayed.

FIG. 7 shows an example in which the area is designated extending to the outside area from the inside of the table format.

When the mouse pointer is dragged/moved beyond ruled lines 703 into a left/right area 702 from a cell area 701, the character lines in all the areas to the area 702 from the cell 701 are selected. In a similar manner as the area designation over the cells, the left/right area forms a context separately from other cells in many cases. When the area designation is performed together with the character lines in the other cells, the character lines in the whole area are selected.

Figure 8:
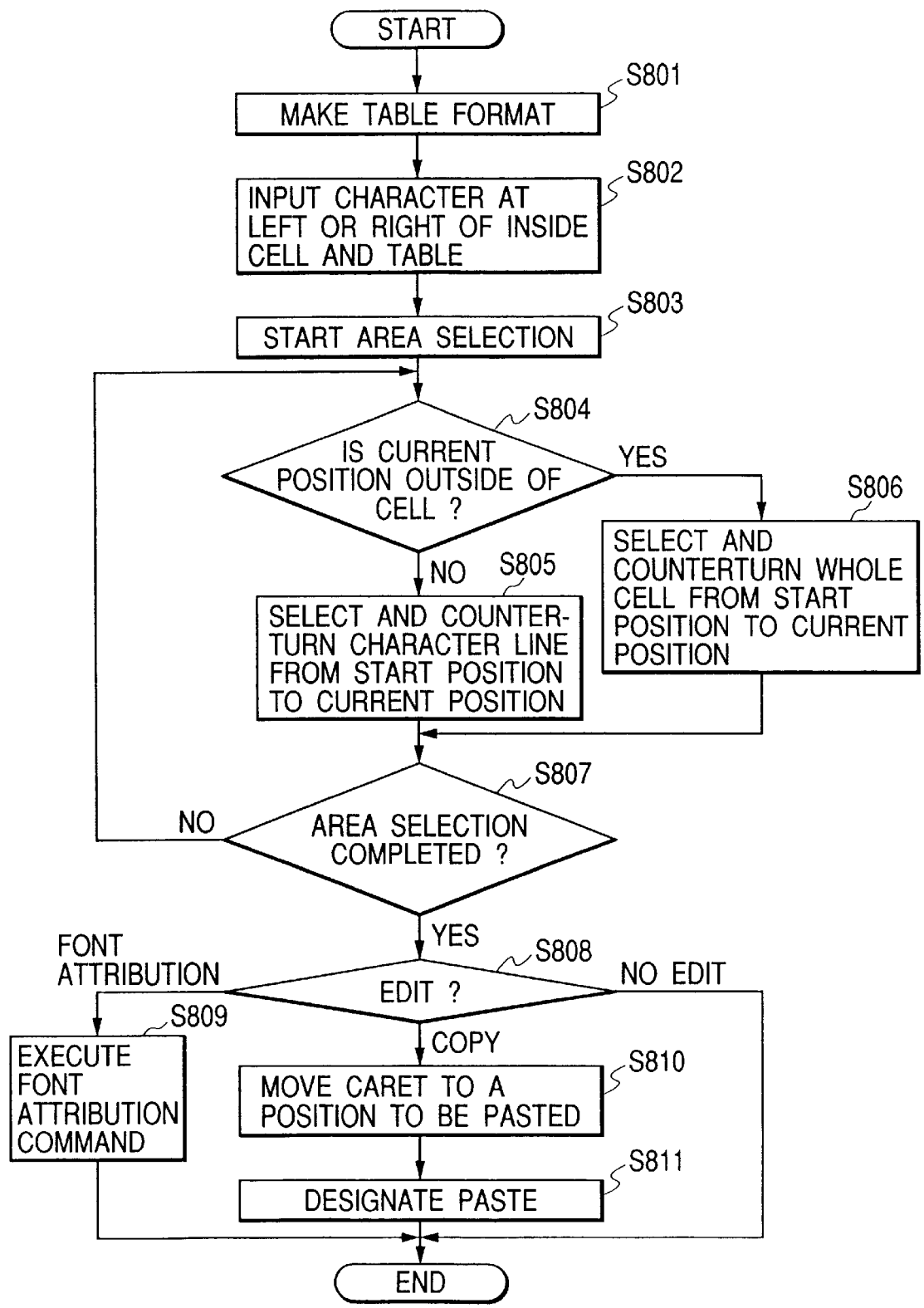
FIG. 8 is a flowchart of an area designation processing.

FIG. 8 is a flowchart showing the character area designation of the table format according to the present embodiment, and the respective area designation processings shown in FIGS. 4 to 7 are also executed by the processing shown in this flowchart.

First, the table format is made in the text area. The table format is made in accordance with the dialog of FIG. 2 (step S801). In the present embodiment, the style of the table format "six lines and four columns" "left justification" "right character input is possible" is selected, and the table format is made in the style. In the HD 10 is generated a management table of 26 cells in total including 24 cells in total of 6×4, and two areas (these areas are treated similarly to the cells) possibly made at the left and right of this table format. Additionally, when it is instructed to make the table format with the left justification as shown in FIG. 2, the management table may be constituted of the cells in the table format and the right-side area of the table format.

Figure 13:
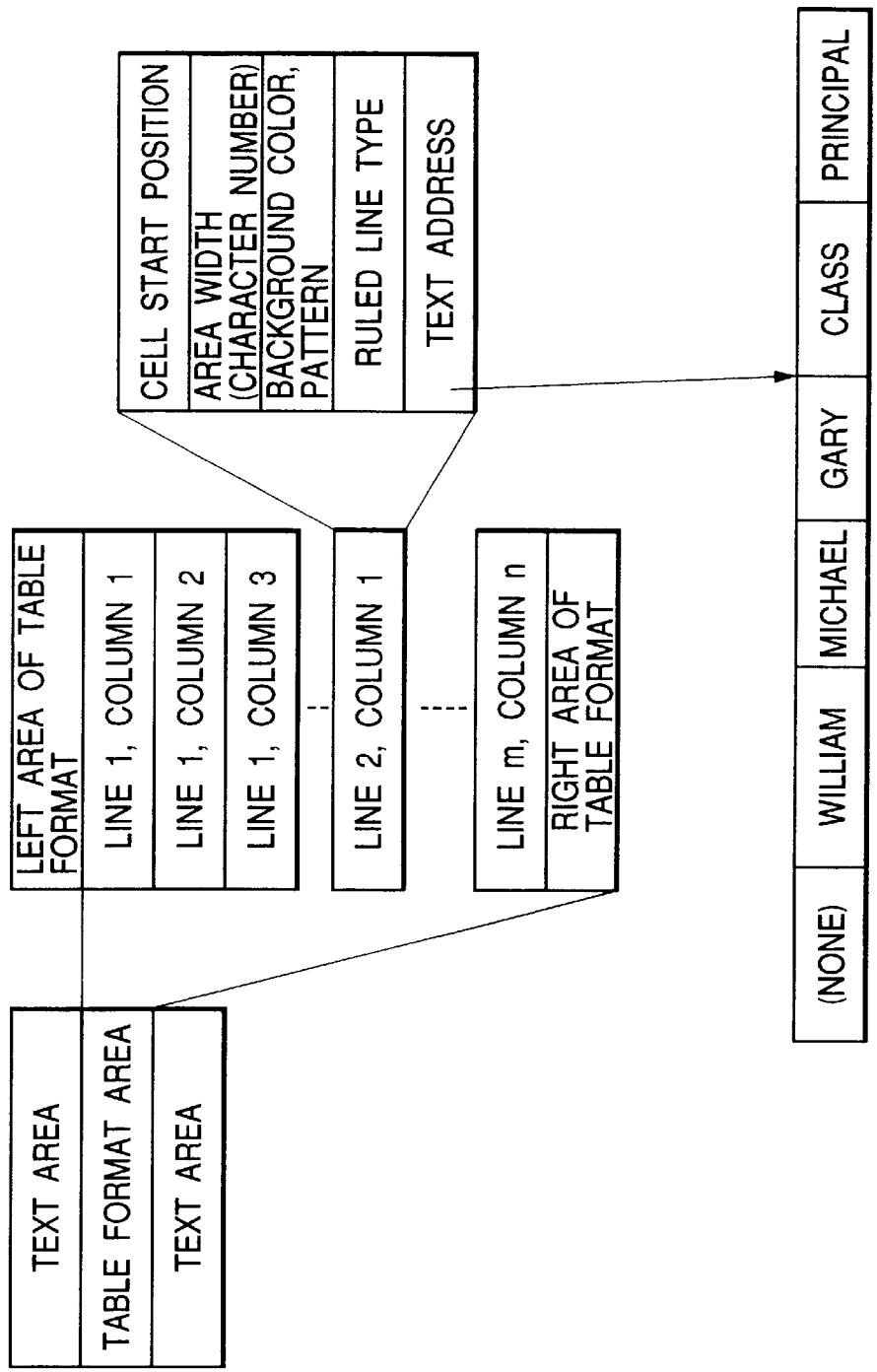
FIG. 13 is a schematic view of a management table and a text table.

FIG. 13 is a schematic view of the management table generated in the HD 10. As the whole, the table format area (table format itself, and including the left/right area of the table format) is managed separately from the front/rear (upper/lower) text area. Additionally, the character cursor operation on the CRT 16 advances from the text area to the table format area, and to the text area without being discontinued.

The management table of the table format area first stores the information of the left area of the table format, successively stores first-line cell information such as the table format first-line first-column cell information and first-line second-column cell information, then stores a second line. This continues to a right lowest cell of the table format, and ends with the information of the right area of the table format. Moreover, this storage order is the same as the cursor movement order.

Each cell (and left/right area) information is constituted of an area start position, area width (this is represented by the number of characters which can be inputted), background color and pattern, ruled line type, and text address. The text is stored in the text table separate from the management table, and the text address indicates the position of the inputted text in the text table.

Subsequently, characters are inputted into the respective cells and the left/right area of the table format (step S802). The character input is performed by selecting the object cell by the cursor of the keyboard 12 or the mouse 13, or inputting the character code by the keyboard 12. FIG. 3 is a diagram in which the characters are inputted into the cell of the made table and to the left/right area of the table format. The character lines inputted to the respective cells are divided by a dividing code for each cell, and stored in the HD 10, and the top address with the character line of each cell stored therein is stored in the management table. Since the left/right area 303 is also treated as one rectangular area in a similar manner as the cell, the characters are fed to the next line every time one line overflows. Moreover, when the character input is instructed exceeding the number of characters which can be disposed in the area, the cell area is vertically enlarged so that the inputted characters can be disposed. Accordingly, the table format may also be enlarged vertically.

Thereafter, the area selection is designated. The coordinate of the position in which the mouse is depressed is set as the start position and stored in the HD 10 (step S803). For the information to be stored, in addition to the coordinate data, the character information or the cell information displayed in the position may be stored. Thereafter, the coordinate of the current mouse position is detected as occasion demands, and compared with each cell area information stored in the HD 10 to judge whether the current designated position is in the same cell as that of the start position (step S804). When it is judged that the position is in the same cell, the character line to the current position from the start position is selected, and counterturned so that the character line can be distinguished from other non-selected characters (step S805). When the cell of the start position is different from the cell of the currently designated position, the whole cell included on the line connecting the start position to the current position is designated as the area, and counterturned (step S806). In some cases, only the cells in the table format are designated as shown in FIG. 5, and in other cases, the left/right area is also included as shown in FIG. 7. Moreover, in the area designation by the cell unit, in the step S806, the cell including the rectangular area formed by the start position and the current position, or the cell including the start position, the cell including the end position, and the cell between the cells (on the straight line or in the rectangular area) may be selected.

In the present embodiment, for the cell area designation, the cell including the rectangle formed by the mouse area designation start position and end position and the left/right area are selected.

Figure 10:
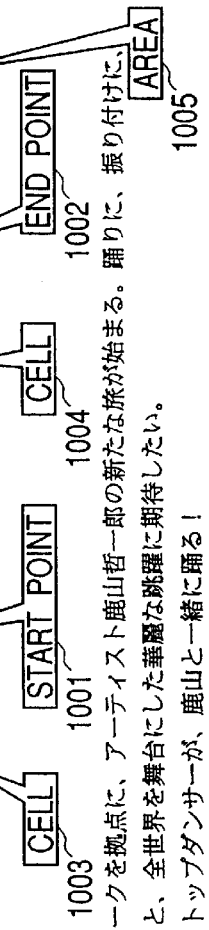
FIG. 10 is a diagram showing the example of the screen in which the area extending to the outside from the inside of the table format is designated.

In FIG. 10, when it is instructed to drag from a point (start point 1001) in a cell 1003 to a point (end point 1002) in an area 1005, the start point 1001 is equal to the end point 1002 in vertical position, so that the cell and left/right area intersecting the straight line between the two points are selected.

Figure 11:
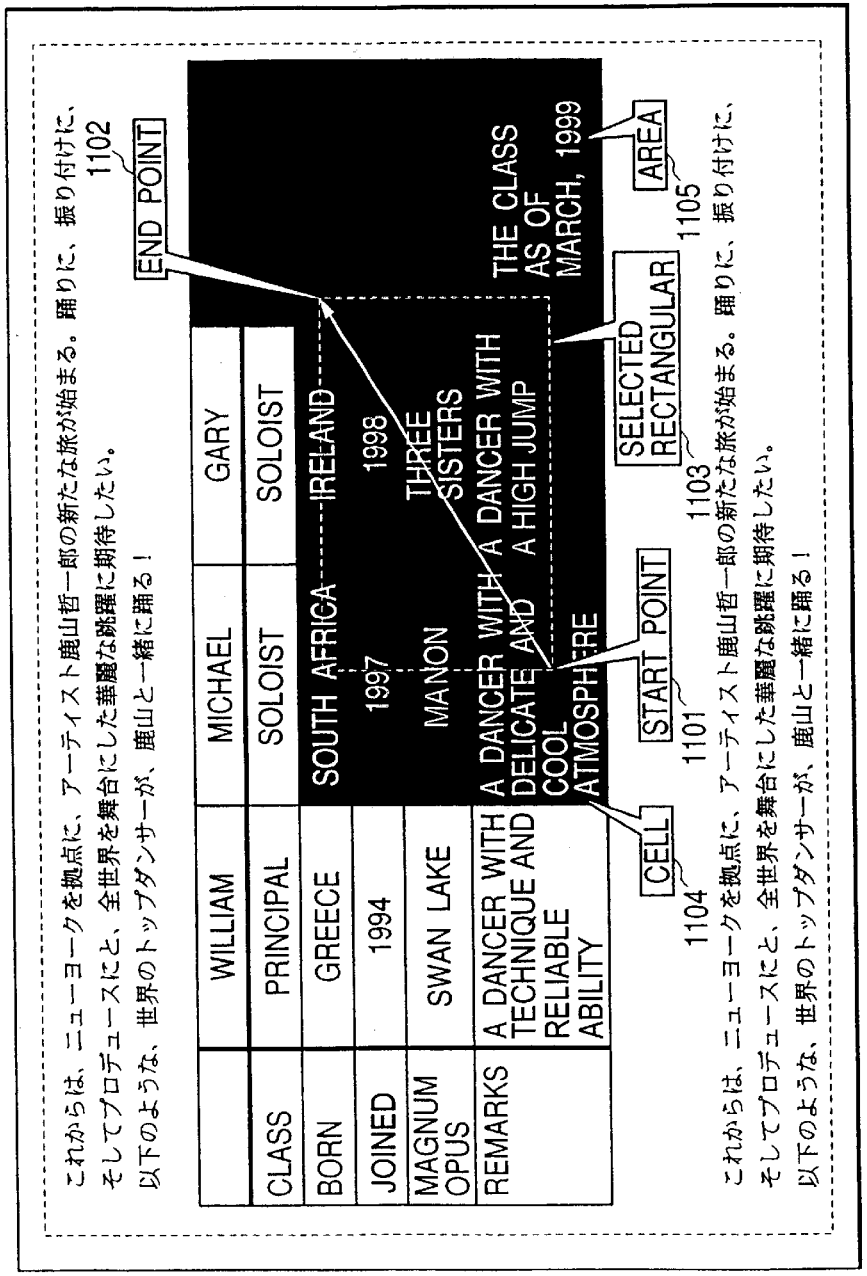
FIG. 11 is a diagram showing the example of the screen in which a rectangular area extending to the outside from the inside of the table format is designated.

In FIG. 11, when it is instructed to drag from a point (start point 1001) in a cell 1104 to a point (end point 1102) in an area 1105, the cells included in a selected rectangle 1103 whose vertexes correspond to the start point 1101 and end point 1102 and the left/right area are selected.

In FIG. 12, when it is instructed to drag from a point (start point 1201) in an area to a point (end point 1202) in a cell 1205, four cells included in a selected rectangle 1203 whose vertexes correspond to the start point 1201 and end point 1202 and one left/right area are selected.

It is judged in step S807 whether the area selection is completed. The area selection is completed when the button depressed in the step S803 is released.

The coordinate of the position where the button is released is inputted as the completion point, the selection is completed, then edition is performed (step S808). When "copying" is instructed in the step S808, the selected data is copied as a series of character lines to the memory area which functions as a clip board in the HD10, a caret is moved to a desired position (step S810), "paste" in the menu is designated (step S811), and the copied data is pasted to the desired position 901. When the "pasting" is performed on the text and area other than the table, a group of a plurality of paragraphs divided by the ruled lines can be pasted. Since the character lines divided by the ruled lines are usually divided in the context, a line spacing is inserted to the data when the character line is stored in the clip board.

Additionally, when "copying" is designated, the cells of the designated areas are extracted in order from the upper cell stored in the management table of FIG. 13. Moreover, a line spacing code is inserted between the texts to divide the texts from each other, and the text is saved in the clip board. The cells in the table format have a stronger relevance with one another than with the left/right area of the table format in many cases. Therefore, in the constitution, the left/right area of the table format is stored in the top or last of the copied character lines, and is not stored between the character lines of the cells in the table format. Since the information in the table format is grouped and stored, the information can easily be handled.

When the area is designated as shown in FIG. 12 and the "copying" is instructed, "Soloist (line spacing code) Ireland (line spacing code) 1998 (line spacing code) Three sisters (line spacing code) (*1) The class as of March, 1999" is stored in the clip board.

On the other hand, in the step S808, when the font attribution, style stetting, and the like are instructed, a font attribution command is executed in step S809.

Additionally, when no edition is instructed in the step S808, the flow ends as it is.

FIG. 9 is a diagram in which the selected character lines are pasted to other places.

In the shown document edition screen, by moving the mouse pointer to the desired position 901, the character lines stored in the clip board are pasted in response to the input of a pasting command.

Here, the left and right of the table format have been described as the example of the cell area set outside the table format. For the document character direction, when column by column writing is performed, the upper and lower areas of the table format may be set. This can be set by reading the document style during the making of the table format.

Moreover, for the cell area set outside the table format, the area is defined by the width from the end of the table format to the margin set in the document style, and by the height of the table format.

As described above, by regarding the vicinity of the table format, such as the left/right or upper/lower area, as one rectangular area, and treating the character line inserted in the area as the character line inputted into the cell, a series of character lines can be selected together with the character lines in the table format, which enhances the operability during the selecting of the character lines.

Moreover, by treating the vicinity of the table format, such as the left/right or upper/lower area, in a similar manner as the cell, the instructing operation is not interrupted between the character line in the table format and the character line in the vicinity, and can smoothly be performed.

What is claimed is:

1. A document processing apparatus for processing a document including a table area, wherein the table area comprises a plurality of cells and a predetermined adjacent area, and wherein the cells are surrounded by ruled lines and the adjacent area is not surrounded by ruled lines, the apparatus comprising:

area designating means for designating an area on a document;

determining means for determining whether the area designated by said area designating means intersects the predetermined adjacent area and at least one of the cells; and character line selecting means for, when said determining means determines that the designated area intersects at least one of the cells and the predetermined adjacent area, selecting the character line included in said intersected cells and the character line included in said intersected adjacent area as a series of character lines.

2. The document processing apparatus according to claim 1, further comprising table making means for making the table area in the document, and for storing data of the made table area, wherein the table area comprises the plurality of cells surrounded by the ruled lines and the predetermined adjacent area.

3. The document processing apparatus according to claim 2, further comprising:

designating means for designating that character input is possible/impossible to the predetermined adjacent area.

4. The document processing apparatus according to claim 3, wherein the adjacent area is switched in accordance with a document direction.

5. The document processing apparatus according to claim 2, wherein the adjacent area is set, when said table format making means makes the table surrounded by the ruled lines.

6. The document processing apparatus according to claim 2, wherein when the character input is instructed with a number of characters exceeding the number of characters able to be disposed in the area, said table making means enlarges the adjacent area so that the characters instructed to be inputted can be arranged.

7. The document processing apparatus according to claim 6, wherein when the adjacent area is enlarged, said table making means also enlarges the area surrounded by the ruled lines.

8. The document processing apparatus according to claim 2, wherein the adjacent area is determined in accordance with a position of the area surrounded by the ruled lines and a document style.

9. The document processing method according to claim 2, further comprising:

a designating step, of designating that character input is possible/impossible to the predetermined adjacent area.

10. The document processing method according to claim 9, wherein when row by row writing is performed in the document edition area, the adjacent area comprises at least one of a left area and a right area of the table format.

11. The document processing method according to claim 9, wherein when column by column writing is performed in the document edition area, the adjacent area comprises at least one area of an upper area and a lower area of the table format.

12. The document processing method according to claim 9, wherein the adjacent area is switched in accordance with a document direction.

13. The document processing method according to claim 9, wherein the adjacent area is determined in accordance with a table format position and a document style.

14. The document processing method according to claim 2, wherein the adjacent area is set, when execution of said table format making step makes the table surrounded by the ruled lines.

15. The document processing method according to claim 2, wherein when the character input is instructed with a number of characters exceeding the number of characters able to be disposed in the area, said table making step includes enlarging the adjacent area so that the characters instructed to be inputted can be arranged.

16. The document processing method according to claim 15, wherein when the adjacent area is enlarged, said table making step further includes enlarging the area surrounded by the ruled lines.

17. The memory medium according to claim 2, wherein the program further comprises:

a designating step, of designating the character input is possible/impossible to the predetermined adjacent area.

18. The memory medium according to claim 17, wherein the adjacent area of is set, when execution of said table format making step makes the table surrounded by the ruled lines.

19. The memory medium according to claim 17, wherein when the character input is instructed with a number of characters exceeding the number of characters able to be disposed in the area, the adjacent area is enlarged in said table making step so that the characters instructed to be inputted can be arranged.

20. The memory medium according to claim 19, wherein when adjacent area is enlarged, the table format is also enlarged in said table making step.

21. The memory medium according to claim 17, wherein when row by row writing is performed in the document edition area, the adjacent area comprises at least one of a left area and a right area of the table format.

22. The memory medium according to claim 17, wherein when writing is performed top to bottom in the document edition area, the adjacent area comprises at least one of an upper area and a lower area of the table format.

23. The memory medium according to claim 17, wherein the adjacent area is switched in accordance with a document direction.

24. The memory medium according to claim 17, wherein the adjacent area is determined in accordance with a table format position and a document style.

25. The document processing apparatus according to claim 1, wherein said area designating means designates the area by inputting a start point and an end point of the area to be designated.

26. The document processing apparatus according to claim 1, wherein the area designated by said area designating means is a rectangular area formed by inputted start point and end point.

27. The document processing apparatus according to claim 1, wherein said character line selecting means inserts a predetermined character between the character lines included in the intersected cell and the intersected adjacent area.

28. The document processing apparatus according to claim 1, further comprising pasting means for pasting said selected character line to a position to which a pasting instruction is given in accordance with the pasting instruction.

29. The document processing apparatus according to claim 1, wherein when left to right writing is performed in said document, said adjacent area is at least one of a left area and a right area adjacent to the area surrounded by the ruled lines.

30. The document processing apparatus according to claim 1, wherein when top to bottom writing is performed in said document, said adjacent area is at least one of an upper area and a lower area adjacent to the area surrounded by the ruled lines.

31. A document processing method for processing a document including a table area, wherein the table area comprises a plurality of cells and a predetermined adjacent area, and wherein the cells are surrounded by ruled lines and the adjacent area is not surrounded by ruled lines, the method comprising:

an area designating step, of designating an area on a document;

a determining step, of determining whether the area designated in said area designating step intersects the predetermined adjacent area and at least one of the cells; and a character line selecting step, of, when it is determined in said determining step that the designated area intersects at least one of the cells and the predetermined adjacent area, selecting the character line included in the intersected cells and the character line included in the intersected adjacent area as a series of character lines.

32. The document processing method according to claim 31, further comprising a table making step, of making the table area in the document, and for storing data of the made table area, wherein the table area comprises the plurality of cells surrounded by the ruled lines and the predetermined adjacent area.

33. The document processing method according to claim 31, wherein said area designating step includes designating the area by inputting a start point and an end point of the area to be designated.

34. The document processing method according to claim 31, wherein the area designated in said area designating step comprises a rectangular area formed by inputted start point and end point.

35. The document processing method according to claim 31, wherein said character line selecting step includes inserting a predetermined character between the character lines included in the intersected cell and the intersected adjacent area.

36. The document processing method according to claim 31, further comprising a pasting step, of pasting the selected character line to a position to which a pasting instruction is given in accordance with the pasting instruction.

37. The document processing method according to claim 31, wherein when left to right writing is performed in the document, the adjacent area is at least one of a left area and a right area adjacent to the area surrounded by the ruled lines.

38. The document processing method according to claim 31, wherein when upper to bottom writing is performed in the document, the adjacent area is at least one of an upper area and a lower area adjacent to the area surrounded by the ruled lines.

39. A memory medium storing a computer-readable document processing control program for processing a document including a table area, wherein the table area comprises a plurality of cells and a predetermined adjacent area, and wherein the cells are surrounded by ruled lines and the adjacent area is not surrounded by ruled lines, the program comprising:

an area designating step, of designating an area on a document;

a determining step, of determining whether the area designated in said area designating step intersects the predetermined adjacent area and at least one of the cells; and a character line selecting step of, when the determining step determines that the designated area intersects at least one of the cells and the predetermined adjacent area, selecting the character line included in the intersected cell and the character line included in the intersected adjacent area as a series of character lines.

40. The memory medium according to claim 39, wherein the document processing control program further comprises a table making step, of making the table area in the document, and of storing data of the made table area, wherein the table area comprises the plurality of cells surrounded by the ruled lines and the predetermined adjacent area.

41. The memory medium according to claim 39, wherein said area designating step includes designating the area by inputting a start point and an end point of the area to be designated.

42. The memory medium according to claim 39, wherein the area designated in said area designating step comprises a rectangular area formed by inputted start point and end point.

43. The memory medium according to claim 39, wherein said character line selecting step includes inserting a predetermined character between the character lines included in the intersected cell and the intersected adjacent area.

44. The memory medium according to claim 39, wherein the document processing control program further comprises a pasting step, of pasting the selected character line to a position to which a pasting instruction is given in accordance with the pasting instruction.

45. The memory medium according to claim 39, wherein when writing is performed in the document, the adjacent area is at least one of a left area and a right area adjacent to the area surrounded by the ruled lines.

46. The memory medium according to claim 39, wherein when top to bottom writing is performed in the document, the adjacent area is at least one of an upper area and a lower area adjacent to the area surrounded by the ruled lines.

* * * * *

UNITED STATES PATENT AND TRADEMARK OFFICE
CERTIFICATE OF CORRECTION

PATENT NO.         : 6,829,744 B1
APPLICATION NO. : 09/545194
DATED                  : December 7, 2004
INVENTOR(S)        : Junichiro Kizaki et al.

It is certified that error appears in the above-identified patent and that said Letters Patent is hereby corrected as shown below:

<u>COLUMN 3</u>:

Line 13, "patent" should read --present--.

<u>COLUMN 6</u>:

Line 22, "characterline" should read --character line--.

<u>COLUMN 9</u>:

Line 52, "set," should read --set--, and "format" should be deleted.

<u>COLUMN 10</u>:

Line 1, "method" should read --apparatus--;
    Line 5, "method" should read --apparatus--;
    Line 9, "method" should read --apparatus--;
    Line 13, "method" should read --apparatus--;
    Line 16, "method" should read --apparatus--;
    Line 19, "method" should read --apparatus--;
    Line 20, "set," should read --set--;
    Line 23, "method" should read --apparatus--;
    Line 29, "method" should read --apparatus--;
    Line 33, "memory medium" should read --document processing apparatus--;
    Line 35, "the" should read --that--;
    Line 37, "memory medium" should read --document processing apparatus--;
    Line 38, "of is set," should read --is set--;
    Line 41, "memory medium" should read --document processing apparatus--;
    Line 47, "memory medium" should read --document processing apparatus--;
    Line 48, "adjacent" should read --the adjacent--;

UNITED STATES PATENT AND TRADEMARK OFFICE
CERTIFICATE OF CORRECTION

| | |
|---|---|
| PATENT NO. | : 6,829,744 B1 |
| APPLICATION NO. | : 09/545194 |
| DATED | : December 7, 2004 |
| INVENTOR(S) | : Junichiro Kizaki et al. |

It is certified that error appears in the above-identified patent and that said Letters Patent is hereby corrected as shown below:

Line 50, "memory medium" should read --document processing apparatus--;
Line 54, "memory medium" should read --document processing apparatus--;
Line 58, "memory medium" should read --document processing apparatus--;
Line 61, "memory medium" should read --document processing apparatus--.

Signed and Sealed this

Twenty-eighth Day of October, 2008

JON W. DUDAS
*Director of the United States Patent and Trademark Office*